Oct. 11, 1955     J. W. HALLEY     2,720,361
DEVICE FOR CONTINUOUSLY INDICATING THE PER CENT
DIFFERENCE BETWEEN TWO SPEEDS OF ROTATION
Filed Dec. 30, 1950
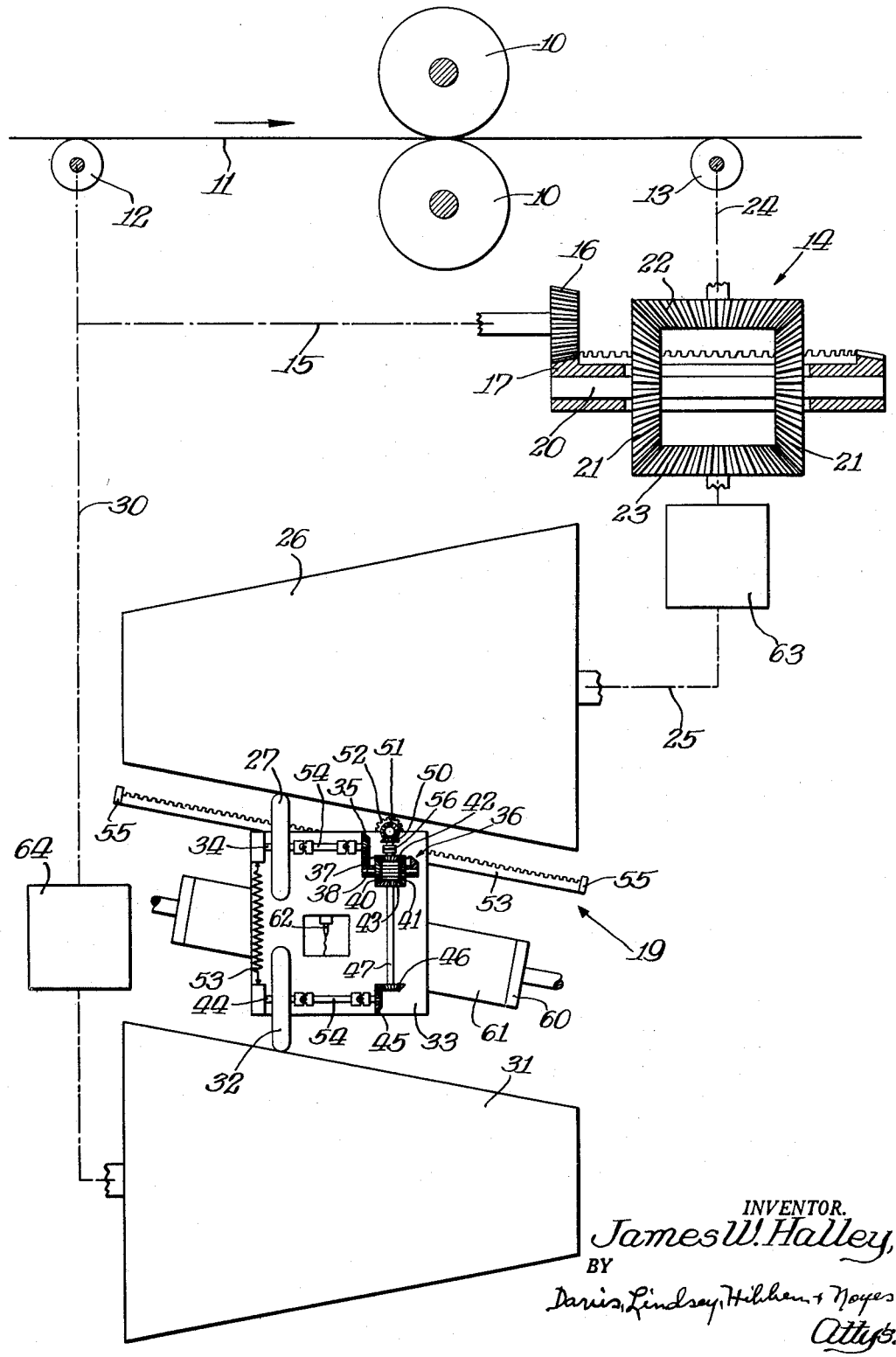
INVENTOR.
James W. Halley,
BY
Davis, Lindsey, Hibben + Noyes
Attys.

United States Patent Office 2,720,361
Patented Oct. 11, 1955

2,720,361

DEVICE FOR CONTINUOUSLY INDICATING THE PER CENT DIFFERENCE BETWEEN TWO SPEEDS OF ROTATION

James W. Halley, Dune Acres, Ind., assignor to Inland Steel Company, Chicago, Ill., a corporation of Delaware Application December 30, 1950, Serial No. 203,692

15 Claims. (Cl. 235—103.5)

The invention relates generally to speed indicating devices and more particularly to a device for continuously indicating the percent difference between the speeds of two rotating members.

There are many instances in industry where it is desired to measure the per cent difference between the speeds of rotation of two rotating members. For example, such rotating members may be in the form of rolls responsive to the linear speed of material such as sheets, strips, rods, threads, wire or the like, where the material is being worked upon in such a manner as to become elongated as a result of such working. The rolls are placed so that they are respectively responsive to the linear speed of the material before and after elongation, and consequently measurement of the ratio of the difference between the speeds of rotation of the two rolls to the speed of one of them gives a measurement of the elongation of the material, which may be expressed as a percentage.

In operations of this character, it is frequently advantageous to be able to obtain the per cent elongation occurring at any instant throughout the operation. It is also frequently desirable to record such information for the entire operation.

The general object of the invention is to provide a novel device for continuously indicating the per cent difference between the speeds of rotation of two rotating members, which is both highly accurate and of rugged construction.

Another object is to provide a novel device of this character, which is particularly adaptable for indicating such per cent differences where the differences are small compared to the speed of rotation of either of the members.

A further object is to provide a novel device of this character, which may be used in connection with apparatus for working a material where such working results in elongation of the material, the device being calibrated to indicate the per cent of elongation at any instant.

Still another object is to provide a novel device of this character, which may include means for recording the per cent difference of the speed of rotation of the two members, or, when used in connection with apparatus producing elongation in a material, then for recording the per cent of elongation.

Other objects and advantages will become apparent from the following description taken in connection with the accompanying drawing, in which:

The figure is a diagrammatic view of a device embodying the features of the invention.

In many situations, it is desirable to directly read the difference of two speeds of rotation expressed as a per cent of one of them rather than as an absolute difference. The problem of providing suitable apparatus for this purpose is particularly difficult for differences in the two speeds, which are much smaller than either of the two speeds. As heretofore stated, the difference in two speeds of rotation may be utilized to determine the elongation of materials resulting from operations performed on the materials, as in the case of rolling operations on metal sheets, strips, rods, wire or the like or on other materials of elongated form where a change in cross-sectional dimension results in an increase in length. One specific instance of where the present device is particularly useful is in connection with a so-called coil skin mill utilized in the steel industry, where very light cold reductions are performed. In this instance, a pair of rollers in the form of riders may be placed in front and back of the mill and are respectively adapted to rotate in conformity with the linear speed of the metal as it approaches the mill and as it leaves the mill, the linear speed of the metal as it leaves the mill, of course, being greater because of the elongation than the linear speed as it approaches the mill.

The present device when used in connection with a mill of this type, is driven by the pair of rollers or riders so that the per cent difference in speed of rotation of the two rollers is determined by the device, such per cent difference of course being the same as the per cent difference in elongation of the metal.

This device comprises generally a first mechanism, in the form of a differential, driven by the two rollers or riders and having an output element adapted to rotate at a speed equal to the difference between the speeds of the two rollers. The device also includes a second mechanism for converting this difference in speed into a ratio, one component of which is this difference and the other of which is the speed of one of the rollers, the device being calibrated so that this ratio is expressed in per cent. This second mechanism comprises a pair of drives, respectively driven by the output element of the first mechanism and by one of said rollers, with at least one of said drives being an adjustable variable speed drive. The pair of drives coact with means operable in response to differences in the output speeds of the two drives to adjust the variable speed drive and thereby adjust the ratio of the output speeds to a predetermined value. Preferably such speeds are equalized. The movement effected by said means provides an indication of the per cent difference in speed of rotation of the two rollers or riders and the indicator employed may be in the form of a recording device so that a complete record of the operation may thereby be obtained.

The device, in its preferred form, is particularly adapted to measure small differences in the rotative speed of the rotating members. Because of the large difference, in such case, in magnitude of the speeds of rotation of the members and the difference between these speeds, which latter is the speed of the output element of first mechanism, the speeds at which the two drives of the second mechanism are driven are altered in a fixed ratio for each to bring them near the same order of magnitude. Thus, in the present instance, the speed of the output element of the first mechanism is increased and the speed of the rotating member which operates one of said drives is reduced, so that both of said drives are operated at speeds of the same order.

It is also contemplated that the device will include means to limit the adjustment of the variable speed drive to a range in which the differences in rotational speeds of the two members normally occur. There will be times, however, such as at the start or at the conclusion of an operation, when the adjustment tends to pass beyond such range due to the fact that one of the two members may not be rotating at all. To accommodate such a condition, the gearing utilized for effecting the adjustment includes a means for permitting the drive to slip, such as a friction clutch, so that when the adjustment is carried to either of its limits, the movable parts will not be forced beyond such limits.

In the embodiment of the invention illustrated diagrammatically in the drawing, a pair of rolls 10 are shown, which may comprise the operating parts of a machine for working an elongated piece of material, indicated at 11, such working resulting in elongation of the material. In the case of a mill for skin rolling steel, 11 represents the steel passing between the rolls 10 which effect the skin rolling, the direction of feed of the steel being indicated by an arrow. Thus, by passing between the rolls 10, the steel 11 will be elongated, and in this particular operation, the per cent of elongation results in the steel having a greater linear speed as it leaves the rolls 10 than the linear speed of the steel entering the rolls.

To measure such elongation, a pair of rollers or riders are driven by the movement of the steel, one of such pair, indicated at 12, contacting the steel as it approaches the rolls 10 and the other of such pair, indicated at 13, contacting the steel at it leaves the rolls 10. It is of course understood that the invention is not limited to such a steel rolling operation but may be used in connection with other materials and other forms of operations where elongation may occur, and may also be used merely where it is desired to know the per cent difference in rotative speed of two rotating members, such members in the present example being the rollers 12 and 13.

In obtaining such per cent difference, the device comprises a first mechanism adapted to obtain the actual difference in speed of the two rotating members 12 and 13. In the preferred form, such first mechanism comprises a differential gearing indicated generally at 14. Thus, as illustrated in the drawing, the roller 12 has a driving connection 15 with a bevel pinion 16. The latter meshes with a bevel ring gear 17 constituting a part of the differential. The ring gear 17 carries a cross shaft 20 on which two miter gears 21 are carried, the miter gears 21 meshing with another pair of miter gears 22 and 23. The miter gear 22 has a driving connection 24 with the roller 13.

With this arrangement and with proper gear ratios and directions of drive, the miter gear 23 constituting the output element of the differential will rotate at a speed equal to the difference in speed between the two rotating members or rollers 12 and 13.

The device, as mentioned above, also includes a second mechanism, indicated generally at 19, for converting this difference in speed to a ratio, that is, the ratio of this difference to the speed of one of the rotating members. In the present instance, the ratio is based on the speed of the roller 12, since the per cent of elongation is sought and this of course should be based on the initial condition of the material. More specifically, the second mechanism comprises a pair of drives, at least one of which is an adjustable variable speed drive. In the illustrated embodiment of the invention, both drives are of the variable speed type and are driven respectively by the output element of the first differential or the miter gear 23 and by the rotating member or roller 12. Both of the variable speed drives are shown as comprising a cone and a friction wheel cooperating therewith. In the drawing, the miter gear 23 is shown as having a driving connection 25 for driving a cone 26 having a friction wheel 27 cooperating therewith, while the roller 12 is shown as having a driving connection 30 for driving a cone 31 having a friction wheel 32 cooperating therewith, the cones 26 and 31 being mounted with their axes parallel and with the large end of each opposite the small end of the other.

The second mechanism also includes means responsive to a difference in the output speeds of the two variable speed drives to adjust these drives to the point where their output speeds have a predetermined relation, which point in the present instance is where their output speeds are equal. The output speeds of the variable speed drives are of course the speeds of the two friction wheels 27 and 32, and to accomplish the foregoing, the two friction wheels are carried on a carriage 33 mounted for movement between and parallel to the adjacent surfaces of the cones 26 and 31.

The carriage 33 also is provided with means responsive to differences in the speeds of the friction wheels 27 and 32 to adjust the carriage parallel to the cones. Thus, the friction wheel 27 is mounted on a shaft 34 driving a pinion 35. The latter is connected to a second differential gearing, indicated generally at 36. Thus, the pinion 35 meshes with a ring gear 37 carrying a cross shaft 38 on which a pair of miter gears 40 and 41 are mounted. The miter gears 40 and 41 mesh with other miter gears 42 and 43. The miter gear 43 is adapted to be driven by the other friction wheel 32. To this end the latter is mounted on a shaft 44 driving a beveled gear 45 meshing with a second beveled gear 46 mounted on a shaft 47 which is connected to the miter gear 43.

From the foregoing, it will be apparent that with proper gear ratios and directions of drive, the miter gear 42 will be driven at a speed equal to any difference in speed between the friction wheels 27 and 32. Of course, if friction wheels 27 and 32 are both operated at the same speed, the miter gear 42 will remain stationary.

Rotation of the miter gear 42 is utilized to move the carriage to the point where the friction wheels 27 and 32 are both rotating at the same speed, and since the miter gear 42 stops rotating when the friction wheels reach the same speed, the carriage 33 will remain in such adjusted position until another difference of speed occurs between the two friction wheels. To effect movement of the carriage 33, gearing is provided comprising a beveled gear 50 connected to the miter gear 42 and meshing with a beveled gear 51. The latter drives a pinion 52 meshing with a stationary rack 53 so that movement of the carriage 33 is thereby effected.

The two friction wheels 27 and 32 are adapted to be pressed against their respective cones 26 and 31 with equal pressure, and to this end, the shafts 34 and 44 are shiftably mounted on the carriage 33 and a compression spring 53 is provided to force the friction wheels 27 and 32 into engagement with their respective cones under equal pressure. Since there may be some slight lateral movement of the shafts 24 and 44, they are connected respectively to the pinion 35 and the beveled gear 45 by means of universal connections 54.

In starting the material 11 through the rolls 10, the rotating member or roller 12 will start rotating before the roller 13. Also at the conclusion of the material 11 passing through the rolls 10, the roller 13 will continue to rotate after the material has passed by the roller 12. These two conditions would tend to cause the carriage 33 to be shifted far beyond its normal range of movement, and of course the difference in speed between the rollers 12 and 13 under these conditions would be of no consequence. For this reason, the movement of the carriage 33 is limited to a range in which the amount of elongation normally occurs, and for this purpose stops 55 are placed at the two ends of the rack 53. When the carriage reaches the ends of its travel as determined by these stops, means is provided to permit the drive of the pinion 52 to slip. For this purpose a friction clutch 56 may be provided in the connection between the miter gear 42 and the beveled gear 50 so that such slippage may occur.

Movement of the carriage 33 is utilized to indicate the percent of elongation in the material 11. Preferably such indication is provided by a recording device here illustrated as comprising a rotatably mounted roller 60 mounted adjacent the carriage 33 and extending generally parallel to the adjacent surfaces of the cones 26 and 31. The recording roller 60 is adapted to carry on its surface a chart 61 which cooperates with a marking device such as a pen 62 carried by the carriage 33. Thus, as the carriage 33 is moved back and forth a line will be drawn on the chart 61. The chart 61, of course, may be calibrated so that the per cent of elongation is shown. The roller 60 may be rotated at a constant speed as by a clock mechanism (not shown) or it may be driven from the roller 12 so that movement of the chart 61 is directly related to the movement of the material 11.

The device herein disclosed is particularly adapted for measuring relatively small elongations in the material 11. Since the speed at which the miter gear 23 rotates will be relatively small compared to the speed of the roller 12, it is desirable to bring these speeds to the same order of magnitude so that the cones 26 and 31 will be rotating at similar speeds. To this end, the drive connection 25 between the miter gear 23 and the cone 26 is provided with speed increasing gearing indicated at 63. Similarly, the drive connection 30 from the roller 12 to the cone 31 is provided with speed reducing gearing 64. The ratio of speed increase provided by the gearing 63 and the ratio of speed reduction provided by the gearing 64 are such that the speeds of rotations of the cones 26 and 31 are of the same order.

The degree of taper of the two cones 26 and 31 will of course determine the range of the per cent elongation that may be shown on a chart 61 of given width. Thus, if the angle of taper is small, the carriage 33 will have to be moved a greater distance, for a given difference in speed of rotation for the friction wheels, to equalize their speed, than if the angle of taper were greater. Such angle of taper should therefore be selected as will provide the desired range on a chart of predetermined width.

To explain the operation of the apparatus, let $R_1$ = R. P. M. of roller 12
$R_2$ = R. P. M. of roller 13

Then $R_2 - R_1$ = R. P. M. of miter gear 23

Let $K_1$ = ratio of speed reduction provided by gearing 64
$K_2$ = ratio of speed increase provided by gearing 63

The peripheral speed of the friction wheel 27 will equal $K_2(R_2-R_1)\pi D_2$, where $D_2$ equals the diameter of the cone 26 at the point of contact with the friction wheel 27.

And the peripheral speed of the friction wheel 32 will equal $K_1 R_1 \pi D_1$, where $D_1$ equals the diameter of the cone 31 at the point of contact with the friction wheel 32.

Since the carriage 33 is adjusted by differences in speed between the friction wheels 27 and 32 so as to bring these two wheels, which have the same diameter, to equal speed, $$K_2(R_2-R_1)\pi D_2 = K_1 R_1 \pi D_1$$

Or $$\frac{R_2-R_1}{R_1} = \frac{K_1 D_1}{K_2 D_2}$$

Since $K_1$ and $K_2$ are constants, the ratio $$\frac{R_2-R_1}{R_1}$$

varies as $$\frac{D_1}{D_2}$$

Since the cones 26 and 31 are of predetermined size, the chart 61 may be calibrated to read in per cent of elongation for any point along the cones. Thus, a record of the elongation will be inscribed on the chart 61 by the pen 62.

To give an example of operation of the device, assume that $R_1$ = 200 R. P. M.

and $R_2$ = 201 R. P. M.

The miter gear 23 will therefore turn at a speed of $R_2 - R_1$ or 1 R. P. M.

To bring the speed of the cones 26 and 31 to the same order of magnitude, the gearing 64 may provide a reduction of 50 to 1 so that the speed of the cone 31 is reduced to $$\frac{200}{50}$$

or 4 R. P. M. The gearing 63 may be so constructed as to provide an increase in the ratio of 4 to 1 so that the cone 26 will rotate at a speed of 1×4 or 4 R. P. M.

Under these conditions, the two friction wheels 26 and 32 will be rotating at the same speed so that no movement of the carriage is effected. The chart 61 is so calibrated that the pen 62 will contact it at a point indicating an elongation of ½%, when the carriage is in this position.

If $R_2$ increases, say to 202 R. P. M., $R_2 - R_1$ becomes 2 and the speed of the cone 26 becomes 2×4 or 8 R. P. M. Friction wheel 27 will then be moving faster than the friction wheel 32 so that the differential 36 will cause the carriage to be shifted to the left until the friction wheels 27 and 32 contact the cones 26 and 31 at a point where the diameter of the cone 31 is twice the diameter of the cone 26, since the cone 31 is rotating at 4 R. P. M. and the cone 26 is rotating at 8 R. P. M. At this point, both friction wheels 27 and 32 will be driven at the same speed so that the carriage 33 will stop. In this position of the carriage, the pen 62 will indicate 1 per cent of elongation on the chart 61.

From the foregoing it will be apparent that I have provided a novel device for continuously indicating the per cent difference between the speeds of rotation of two rotating members. It will also be apparent that this device is particularly adapted for use where such per cent differences are relatively small. The apparatus is particularly useful in connection with operations where work is performed on elongated material, where such work results in the elongation of the material as an incident to the working thereon, and the movement of the material before and after such working may readily be converted into rotation of two members.

I claim:

1. A device for indicating the ratio of the difference in speed between two rotating members to the speed of one of them, comprising a differential mechanism adapted to be driven by said members and having an output element driven at a speed equal to the difference of the speeds of said members, and a second mechanism comprising a pair of adjustable variable speed drives each having an output element and one driven by said output element of the differential mechanism and the other driven by one of said members, and means including a differential mechanism driven by the output elements of said drives and shiftable in response to differences in speeds of the output elements of said drives to adjust said drives to bring the ratio of the speeds of their output elements to a predetermined value.

2. A device for indicating the ratio of the difference in speed between two rotating members to the speed of one of them, comprising a first mechanism adapted to be driven by said members and having an output element driven at a speed equal to the difference of the speeds of said members, and a second mechanism comprising a pair of drives one driven by said one member and the other driven by said output element, one of said drives being adjustable to vary its output speed, and means including a differential mechanism driven by the output elements of said drives and operable in response to a difference in the output speeds of said drives to adjust said one drive to bring the ratio of the output speeds of said drives to a predetermined value.

3. A device for indicating the ratio of the difference in speed between two rotating members to the speed of one of them, comprising a first mechanism adapted to be driven by said members and having an output element driven at a speed equal to the difference of the speeds of said members, and a second mechanism comprising a pair of rotary elements one having a driving connection with said one member and the other having a driving connection with said output element, at least one of said driving connections being adjustable to vary the speed of its associated rotary element, and means including a differential mechanism driven by the output elements of said drives and operable in response to a difference in the speeds of said rotary elements to adjust said one driving connection to bring the speeds of said rotary elements to a predetermined ratio.

4. A device for indicating the ratio of the difference in speed between two rotating members to the speed of one of them, comprising a first mechanism adapted to be driven by said members and having an output element driven at a speed equal to the difference of the speeds of said members, and a second mechanism comprising a pair of drives one driven by said one member and the other driven by said output element, one of said drives comprising input and output elements with said elements relatively adjustable to vary the output speed thereof, and means including a differential mechanism driven by the output elements of said drives and operable in response to a difference in the output speeds of said drives to effect relative adjustment between the input and output elements of said one drive and thereby bring the ratio of the output speeds of said drives to a predetermined value.

5. A device for indicating the ratio of the difference in speed between two rotating members to the speed of one of them, comprising a first mechanism adapted to be driven by said members and having an output element driven at a speed equal to the difference of the speeds of said members, and a second mechanism comprising a pair of drives one driven by said one member and the other driven by said output element, one of said drives comprising a rotatably driven cone and a friction wheel coacting with said cone and adjustable along the cone to vary its output speed, and means including a differential mechanism driven by the output elements of said drives and operable in response to a difference in the output speed of said friction wheel to the output speed of the other drive to adjust said friction wheel along said cone and thereby bring the ratio of said output speeds to a predetermined value.

6. A device for indicating the ratio of the difference in speed between two rotating members to the speed of one of them, comprising a first mechanism adapted to be driven by said members and having an output element driven at a speed equal to the difference of the speeds of said members, and a second mechanism comprising a pair of drives, one driven by said one member and the other driven by said output element, each of said drives comprising input and output elements with said elements relatively adjustable to vary the speed of the output elements, and means including a differential mechanism driven by the output elements of said drives and operable in response to a difference in the speeds of the output elements of said drives to effect relative adjustment between the input and output elements of both drives and thereby bring the ratio of the output speeds of said drives to a predetermined value.

7. A device for indicating the ratio of the difference in speed between two rotating members to the speed of one of them, comprising a first mechanism adapted to be driven by said members and having an output element driven at a speed equal to the difference of the speeds of said members, and a second mechanism comprising a pair of drives, one driven by said one member and the other driven by said output element, each of said drives comprising a rotatably driven cone and a friction wheel coacting with said cone and adjustable along the cone to vary its output speed, and means including a differential mechanism driven by the output elements of said drives and operable in response to a difference in the output speeds of said friction wheels, to adjust them simultaneously along their respective cones and thereby bring the ratio of said output speeds to a predetermined value.

8. A device for indicating the ratio of the difference in speed between two rotating members to the speed of one of them, comprising a first mechanism adapted to be driven by said members and having an output element driven at a speed equal to the difference of the speeds of said members, and a second mechanism comprising a pair of drives, one driven by said one member and the other driven by said output element, each comprising a rotatably mounted cone and a friction wheel coacting with said cone, the cones of the two drives being mounted on parallel axes with the small end of each cone opposite the large end of the other cone and with the friction wheels located between the cones, said friction wheels being adjustable longitudinally of the cones to oppositely vary the speeds of said friction wheels and thereby bring the ratio of said speeds to a predetermined value.

9. A device for indicating the ratio of the difference in speed between two rotating members to the speed of one of them, comprising a first mechanism adapted to be driven by said members and having an output element driven at a speed equal to the difference of the speeds of said members, and a second mechanism comprising a pair of drives one driven by said one member and the other driven by said output element, one of said drives being adjustable to vary its output speed, a movable carriage for adjusting said one drive, a differential gearing mounted on said carriage and driven by both of said drives, and drive gearing driven by said differential gearing for moving said carriage in response to variations in the ratio of the output speeds of said drives to adjust said one drive and thereby bring the ratio of the output speeds of said drives to a predetermined value.

10. A device for indicating the ratio of the difference in speed between two rotating members to the speed of one of them, comprising a first mechanism adapted to be driven by said members and having an output element driven at a speed equal to the difference of the speeds of said members, and a second mechanism comprising a pair of drives each comprising a rotatably mounted cone and a friction wheel coacting with said cones, the cones of the two drives being driven respectively by said one member and by said output element and being mounted on parallel axes with the small end of each cone opposite the large end of the other cone, a carriage mounted between said cones for movement parallel to the surfaces thereof and carrying said friction wheels, drive gearing for moving said carriage, and means operable in response to variations in the ratio of the speeds of said friction wheels to drive said drive gearing, thereby moving said friction wheels along said cones to bring the ratio of the speeds thereof to a predetermined value.

11. A device for indicating the ratio of the difference in speed between two rotating members to the speed of one of them, comprising a first mechanism adapted to be driven by said members and having an output element driven at a speed equal to the difference of the speeds of said members, and a second mechanism comprising a pair of drives each comprising a rotatably mounted cone and a friction wheel coacting with said cone, the cones of the two drives being of equal size and being driven respectively by said one member and by said output element and being mounted on parallel axes with the small end of each cone opposite the large end of the other cone, the friction wheels being of equal size, a carriage mounted between said cones for movement parallel to the surfaces thereof and carrying said friction wheels, drive gearing for moving said carriage, and differential mechanism driven by said friction wheels and having an output element operable in response to differences in the speeds of said friction wheels to drive said drive gearing, thereby moving said carriage to move said friction wheels along the cones to the point where the speeds of the friction wheels are equal.

12. A device for indicating the ratio of the difference in speed between two rotating members to the speed of one of them, comprising a differential mechanism adapted to be driven by said members and having an output element driven at a speed equal to the difference of the speeds of said members, a second mechanism comprising a pair of drives one driven by said one member and the other driven by said output element, gearing for increasing speed interposed between said output element and its associated drive, gearing for reducing speed interposed between said one member and its associated drive, one of said drives being adjustable to vary its output speed, and means including a differential mechanism driven by the output elements of said drives and operable in response to a difference in the output speeds of said drives to adjust said one drive to equalize the output speeds of said drives.

13. A device for indicating the ratio of the difference in speed between two rotating members to the speed of one of them, comprising a first mechanism adapted to be driven by said members and having an output element driven at a speed equal to the difference of the speeds of said members, and a second mechanism comprising a pair of drives each comprising a rotatably mounted cone and a friction wheel coacting with said cone, the cones of the two drives being driven respectively by said one member and by said output element and being mounted on parallel axes and tapering in opposite directions, a carriage mounted between said cones for movement parallel to the surfaces thereof and carrying said friction wheels, spring means interposed between said friction wheels for holding them in driving contact with their cones with equal pressure, and means including a differential mechanism driven by the output elements of said drives and operable in response to differences in the speeds of said friction wheels to move said carriage along the cones to the point where the speeds of the friction wheels are equal.

14. A device for indicating the ratio of the difference in speed between two rotating members to the speed of one of them, comprising a first mechanism adapted to be driven by said members and having an output element driven at a speed equal to the difference of the speeds of said members, and a second mechanism comprising a pair of drives one driven by said one member and the other driven by said output element, one of said drives being adjustable to vary its output speed, differential mechanism driven by both of said drives, a carriage, drive gearing for moving said carriage and driven by said differential mechanism in response to differences in the output speeds of said drives to adjust said one drive to equalize said output speeds, and means for recording the movement of said carriage.

15. A device for indicating the ratio of the difference in speed between two rotating members to the speed of one of them, comprising a first mechanism adapted to be driven by said members and having an output element driven at a speed equal to the difference of the speeds of said members, and a second mechanism comprising a pair of drives one driven by said one member and the other driven by said output element, one of said drives being adjustable to vary its output speed, a movable carriage, drive gearing for moving said carriage in response to differences in the output speeds of said drives, and stops for limiting the movement of said carriage, said drive gearing including a friction clutch adapted to slip when said carriage engages one of said stops.

References Cited in the file of this patent

UNITED STATES PATENTS

| | | |
|---|---|---|
| 558,315 | Shaw | Apr. 14, 1896 |
| 789,446 | Parcelle | May 9, 1905 |
| 1,807,698 | Michl | June 2, 1931 |
| 1,920,024 | Stehil | July 25, 1933 |
| 2,132,911 | Wellton | Oct. 11, 1938 |
| 2,158,137 | McConnell | May 16, 1939 |
| 2,437,048 | Salles | Mar. 2, 1948 |
| 2,511,104 | Eddy | June 13, 1950 |
| 2,551,502 | Montrose-Oster | May 1, 1951 |

FOREIGN PATENTS

| | | |
|---|---|---|
| 223,576 | Germany | June 25, 1910 |